United States Patent [19]

Eck et al.

[11] 3,755,318

[45] Aug. 28, 1973

[54] PROCESS FOR PRODUCING PRIMARY CARBOXYLIC ACID AMIDES

[75] Inventors: Herbert Eck; Joseph Heckmaier; Hellmuth Spes, all of Burghausen-Obb, Germany

[73] Assignee: Wacker-Chemie GmbH, Munich, Germany

[22] Filed: Apr. 5, 1971

[21] Appl. No.: 131,541

Related U.S. Application Data

[63] Continuation of Ser. No. 782,744, Dec. 10, 1968, abandoned.

[52] U.S. Cl.. 260/247.7 H, 260/293.86, 260/297 R, 260/326.5 E, 260/561 R, 260/562 P, 260/562 R, 260/562 N, 424/248
[51] Int. Cl.............................................. C07d 87/34
[58] Field of Search ................. 260/247.7 H, 562 P, 260/293.86, 297 R, 326.5 E

[56] References Cited
OTHER PUBLICATIONS

Lonza Ltd. (by August Stocker) Chemical Abstracts Vol. 59, page 7377, (1963).

*Primary Examiner*—Alex Mazel
*Assistant Examiner*—Jose Tovar
*Attorney*—Donald Malcolm

[57] ABSTRACT

Process for producing primary carboxylic acid amides of the general structure $RR'N-CO-CHR''R'''$ by reacting a ketene having the general formula $R''R'''C=CO$ with an amine having the general structure $HNRR'$, where R and R' are hydrogen, substituted or unsubstituted aryl- or alkyl residues, which can form, together, an alicyclic or a heterocyclic non-aromatic ring, and R'' and R''' can be hydrogen, alkyl- or aryl residues, where the alkyl residues may have up to four carbon atoms, in which the reaction of ketene with amine is carried out in the corresponding carboxylic acid amide at a temperature above the melting point and below the decomposition point of the reaction mixture.

4 Claims, No Drawings

PROCESS FOR PRODUCING PRIMARY CARBOXYLIC ACID AMIDES

This application is a streamlined continuation of application Ser. No. 782,744, filed Dec. 10, 1968, now abandoned.

BACKGROUND OF THE INVENTION

Carboxylic acid amides can be produced, besides by the addition of water to nitriles and by splitting off water from ammonium salts, by acylation of amines. This acylation is successful, for instance, with carboxylic acid chlorides or with carboxylic acid anhydrides. In such case the desired carboxylic acid amide must be separated from the reaction solution in a further step.

If the acetylation is performed with ketene, the yield of the second conversion product, in the above case hydrogen chloride or carboxylic acid, can be avoided.

Hydroxyl group containing solvents, such as water and alcohol, catalyze the reaction, which is why these have so far been preferred.

The conversion of slightly basic, i.e. reaction sluggish amines, is catalyzed by acids. In these cases one can also work in inert solvents.

Highly reactive amines, e.g. methylamine, react with ketenes even without a catalyst. However, because of the strong exothermic reaction one always works in heterogeneous solvents, which also makes a separation of the amide necessary.

SUMMARY OF THE INVENTION

We have now discovered a process for producing primary carboxylic acid amides of the general structure $RR'N-CO-CHR''R'''$ by reacting ketenes of the general formula $R''R'''C=CO$ with amines of the general structure $HNRR'$ where R and R' are hydrogen, substituted or unsubstituted aryl- or alkyl residues which can together also form an ali-cyclic or heterocyclic non-aromatic ring, and R'' and R''' are hydrogen, alkyl- or aryl residues, where the alkyl residues may have up to 4 carbon atoms. The process is characterized by the fact that we carry out the reaction of ketene with amine in the corresponding carboxylic acid amide at temperatures above the melting point, but below the decomposition point of the reaction mixture. It is surprising that with this work method can even achieve the ketene addition to reaction-sluggish amines with very good yields.

Moreover, reactive amides can be converted in spite of strong heat generation, since either amine or ketene are present in the reaction mixture always only in low concentrations.

It is known that secondary and tertiary amides can be produced by the action of ketene on carboxylic acid amides which still have one or two H atoms on the nitrogen. Surprisingly, however, one obtains in accordance with the process of our invention — primary carboxylic acid amides in excellent yields. No secondary carboxylic acid amides could be detected in the reaction product.

DESCRIPTION OF THE PREFERRED EMBODIMENTS

As starting materials one can use quite generally ammonia and primary and secondary, aliphatic and aromatic, perhaps substituted amines, e.g. methylamine, ethylamine, propylamine, isopropylamine, butylamine, pentylamine, hexylamine, dodecylamine, ethylene diamine, diethylene triamine, hexamethylene diamine, dimethylamine, diethylamine, dipropylamine, diisopropylamine, dibutylamine, dihexylamine, aniline, N-alkylanilines like methylaniline, diphenylamine, naphthylamine, toluylene diamine, 4,4'-diaminodiphenylmethane, phenylene diamine, morpholine, piperidine, tetrahydropyrrol, aminopyridine.

As reaction partners one can use quite generally ketene of the formula $R''R'''C=CO$, e.g. ketene, methylketene, ethylketene, propylketene, isopropylketene, butylketene, dimethylketene, diethylketene, dibutylketene, diphenylketene.

The reaction is usually carried out at normal pressure, but it can also take place in a vacuum or under excess pressure.

The process is carried out as follows:

We place carboxylic acid amide in a suitable apparatus, heat it until it melts and then we introduce at the same time ketene and amine into the melt. As apparatus one can use simple flasks or retorts, if one works discontinuously. In case of continuous operation these receptacles are equipped with overflow pipes through which the emerging carboxylic acid amide is piped off at the rate at which it is created. As reaction vessels one can use with equal success reaction tubes, towers, circulating apparatus with carboxylic acid amide circulated therein.

EXAMPLE 1

Into a melt of 33.9 g N,N-diphenylacetamide we pump continuously at about 100° C a mixture of 20 g N,N-diphenylacetamide and 110 g diphenylamine (0.651 mol) with the melting point of 37° C. At the same time 0.645 mol ketene was piped in. The two reaction components were dosaged in such a manner that there was always a slight excess of amine. The reaction product was processed by fractional vacuum distillation at 0.09 mm Hg column. The following was obtained:

28.0 g (=25.5 percent of the quantity used) diphenylamine (Mp: 43°C), 153.4 g N,N-diphenylacetamide (Mp: 98° – 99° C) which, after deducting the 53.9 g used as solvent, amount to 72.5 percent.

The residue amounted to only 2.1 g. This corresponds to a yield of 98 percent at a conversion of 72.5 percent.

Comparative Example

Into a melt of 110 g (0.651 mol) diphenylamine one pipes 0.651 mol ketene at about 100° C and the product is fractionated at 0.09 mm Hg. The yield was:

39.7 g (=36.1 percent of the quantity used) of the starting substance with a melting point of 44° – 46° C, 55.0 g (40.1 percent) N,N-diphenylacetamide with a melting point of 95° – 98° C, and 27.6 g of residue.

EXAMPLE 2

Into a fritting tower we pipe 31 g/h methylamine and 42 g/h ketene (mol ratio 1 : 1) at 30° C, continuously, into N-methylacetamide. The duration of the experiment is 16 hours. By fractional distillation the following products were obtained:

Low boiling substance: 3.0 percent
N-methylacetamide: 92.5 percent (= 1079 g) and residue: 2.5 percent The distilling loss amounted to 2 percent.

The reaction with hexylamine and with isopropylamine was identical.

COMPARATIVE EXAMPLE

Into a fritting tower filled with water we piped at 30° C, continuously, within 16 hours 6.4 l aqueous methylamine solution (79.3 g/l) and 672 g ketene. By fractional distillation the following fractions were obtained:
1. water,
2. boiling point, 10 mm Hg: 40° – 79° C: 575 g intermediate fraction,
3. boiling point, 10 mm Hg: 79° – 88° C: 940 g essentially the desired reaction product, about 90 – 95 percent pure; could not be made to crystallize.
4. boiling point, 10 mm Hg: 88° – 90° C: 173 g pure N-methylacetamide; crystalline, residue: 14.4 g.

In spite of identical distilling conditions only 173 g (14.8 percent) of pure N-methylacetamide could be obtained.

The distillation work is very great, particularly because of the necessary removal of the water.

EXAMPLE 3

As in the process of the above Examples, morpholine was converted at 140° – 150° C into N-acetylmorpholine with ketene. The yield of analytically pure N-acetylmorpholine (Bp: 10 mm Hg: 111° – 115° C) was 91.6 percent. The first run and the secondary running contain another 2 – 2.5 percent. Moreover, about 1.5 percent morpholine was recovered.

We claim:

1. A process of producing carboxylic acid amides of the structure RR'N-CO-CH$_3$, wherein R R'N is the residue of any amine recited in the Markush group below, which comprises reacting ketene with an amine selected from the group consisting of methylamine, ethylamine, propylamine, isopropylamine, butylamine, pentylamine, hexylamine, dodecylamine, ethylene diamine, diethylene triamine, hexamethylene diamine, dimethylamine, diethylamine, dipropylamine, diisopropylamine, dibutylamine, dihexylamine, aniline, methylaniline, diphenylamine, naphthylamine, toluylene diamine, 4,4'-diaminodiphenylmethane, phenylene diamine, morpholine, piperidine, tetrahydropyrrol, and aminopyridine, in which the reaction of ketene with amine is carried out in the corresponding carboxylic acid amide at a temperature above the melting point and below the decomposition point of the reaction mixture.

2. Process for producing N,N-diphenylacetamide according to claim 1, in which ketene is reacted with diphenylamine in a melt of N,N-diphenylacetamide.

3. Process for producing N-methylacetamide according to claim 1, in which ketene is reacted with methylamine in N-methylacetamide.

4. Process for producing N-acetylmorpholine according to claim 1, in which ketene is reacted with morpholine in N-acetylmorpholine.

* * * * *